United States Patent
Davidson et al.

(10) Patent No.: US 8,335,730 B2
(45) Date of Patent: *Dec. 18, 2012

(54) SCORECARD REPORTING SYSTEM

(75) Inventors: David A. Davidson, Cumming, GA (US); Scott P. Elsky, Brooklyn, NY (US); William A. Parkan, Pearland, TX (US)

(73) Assignee: Accenture Global Services Limited, Dublin (IE)

( * ) Notice: Subject to any disclaimer, the term of this patent is extended or adjusted under 35 U.S.C. 154(b) by 230 days.

This patent is subject to a terminal disclaimer.

(21) Appl. No.: 12/830,171

(22) Filed: Jul. 2, 2010

(65) Prior Publication Data

US 2010/0299279 A1    Nov. 25, 2010

Related U.S. Application Data

(63) Continuation of application No. 11/184,672, filed on Jul. 19, 2005, now Pat. No. 7,752,094.

(51) Int. Cl.
*G06F 17/22* (2006.01)

(52) U.S. Cl. ............................................. 705/31; 705/11

(58) Field of Classification Search .................... 705/31, 705/11

See application file for complete search history.

(56) References Cited

U.S. PATENT DOCUMENTS

| | | | |
|---|---|---|---|
| 5,772,251 A | 6/1998 | Fleck | |
| 5,774,872 A | 6/1998 | Golden et al. | |
| 5,983,227 A | 11/1999 | Nazem et al. | |
| 6,064,983 A | 5/2000 | Koehler | |
| 6,078,899 A | 6/2000 | Francisco et al. | |
| 6,345,239 B1 | 2/2002 | Bowman-Amuah | |
| 6,425,525 B1 | 7/2002 | Swaminathan et al. | |
| 6,473,741 B1 | 10/2002 | Baker | |
| 6,567,789 B1 | 5/2003 | Baker | |
| 6,697,787 B1 | 2/2004 | Miller | |
| 7,234,103 B1 | 6/2007 | Regan | |
| 7,752,094 B2* | 7/2010 | Davidson et al. | 705/31 |
| 7,827,100 B2* | 11/2010 | Singh | 705/38 |
| 2003/0055754 A1 | 3/2003 | Sullivan | |
| 2003/0061131 A1* | 3/2003 | Parkan, Jr. | 705/30 |
| 2003/0149614 A1* | 8/2003 | Andrus et al. | 705/11 |
| 2003/0233297 A1* | 12/2003 | Campbell | 705/31 |
| 2004/0078271 A1 | 4/2004 | Morano et al. | |
| 2004/0083145 A1 | 4/2004 | Kobayashi et al. | |

OTHER PUBLICATIONS

Bill Hubly. "The balanced scorecard: Successful implementation." Journal of Tax Practice Management Jan. 1, 2003: ABI/INFORM Global, ProQuest. Web. Feb. 13, 2010.*

Bill Hubly, The Balanced Scorecard: Successful Implementation. Journal of Tax Practice Management Jan. 1, 2003, ABI/INFORM Global, Proquest. Web. Feb. 13, 2010. 1p.

* cited by examiner

*Primary Examiner* — Scott Zare
*Assistant Examiner* — Talia Crawley
(74) *Attorney, Agent, or Firm* — Brinks Hofer Gilson & Lione

(57) ABSTRACT

A data processing system generates a scorecard analysis that displays multiple scorecard windows, each directed to a specific different perspective on a particular business function. Each perspective may have at least one corresponding objective, and each objective may have at least one corresponding key performance indicator. Each scorecard may include drill down capability from a top level analysis to more detailed information on a perspective, objective, or key performance indicator.

21 Claims, 14 Drawing Sheets

Corporate Tax Scorecard

Tax Excellence

Time [All Time.2004.Q3] ... ⊙ Slices  Expend All  Collapse All

| Scorecard | Previous | Current | Target Status |
|---|---|---|---|
| ☐ Tax Excellence | 3.73% | 99% | ○ |
| ☐ Manage Effective Tax Rate | 3.73% | | |
| ⌕ Effective Tax Rate | 11.62% | | 322 |
| ☐ Manage Budget | | 99% | ○ |
| ⌕ Budget | $31,603.26 | $31,603.26 | ○ |

Business Process Excellence

Time [All Time.2004.Q3.Aug] ... ⊙ Slices  Expend All  Collapse All

| Scorecard | Previous | Current | Trend |
|---|---|---|---|
| ☐ Business Process Excellence | 99% | 99% | ⇧ |
| ☐ Increase Process Efficiency | 99% | 99% | ⇘ |
| ⌕ Active Processes | 5 | 6 | ⇘ |
| ⌕ Completed Processes | 12 | 3 | ⇘ |
| ☐ Increase Knowledge Sharing | 99% | 99% | ⇧ |
| ⌕ Documents Contributed | 3 | 13 | ⇘ |
| ⌕ Documents Accessed | 877 | 1,181 | ⇘ |

Finance Excellence

Time [All Time.2004.Q3] ... ⊙ Slices  Expend All  Collapse All

| Scorecard | Previous | Current | Status |
|---|---|---|---|
| ☐ Finance Excellence | 30.56% | 30.56% | ○ |
| ☐ Monitor Financial Data | 30.56% | 30.56% | ○ |
| ⌕ Income Before Taxes (IBT) | | $11,874.00 | ○ |
| ⌕ Rating Agency LiquidityRatio | 1.18 | 1.19 | △ |

Employee Excellence

Time [All Time.2004.Q3] ... ⊙ Slices  Expend All  Collapse All

| Scorecard | Previous | Current | Status |
|---|---|---|---|
| ☐ Employee Excellence | | 41.26% | △ |
| ☐ Encourage High Performances | | 59.57% | △ |
| ⌕ Cross-Function Collaboration | | 2.51 | △ |
| ⌕ Allocation of Time | | 2.74 | △ |
| ☐ Improve Communication | | 40.17% | △ |
| ⌕ Communication | | 2.20 | △ |
| ☐ Encourage Learning & Growth | | 34.05% | △ |
| ⌕ Performance Feedback | | 2.22 | △ |
| ⌕ Growth | | 1.62 | △ |

FIGURE 5

| Scorecard | Previous | Current | Target | Status |
|---|---|---|---|---|
| ⊟ Business Process Excellence | 39.77% | 78.33% | | ○ |
| ⊟ Increase Process Efficiency | 13.33% | 56.67% | | △ |
| Active Processes | 12 | 37 | 42 | △ |
| Completed Processes | 12 | 37 | 42 | △ |
| ⊟ Increase Knowledge Sharing | 66.22% | 100% | | ○ |
| Documents Contributed | 934 | 4,427 | 624 | ○ |
| Documents Accessed | 934 | 4,427 | 1560 | ○ |

FIGURE 6

| Increase Process Efficiency | |
|---|---|
| Attribute Name | Attribute Value(s) |
| KPI Group Name | Increase Process Efficiency |
| Description | Encourage a collaborative work environment that utilized technology to increase efficiency. |
| Contact Name | Tax Leadership Team |
| Additional Documents | |
| Weight | 1 |
| Indicator | Stoplight(3) |
| Created | Date created: |
| Last Updated | Date updated: |

Status and Boundary Information

| Level | Indicator | Boundaries |
|---|---|---|
| 1 | ◇ | Less than 33.33% |
| 2 | △ | Greater than or equal to 33.33% and less than 66.67% |
| 3 | ○ | Greater than or equal to 66.67% |

FIGURE 7

| Process Total | | | | |
|---|---|---|---|---|
| Process Definition | Status ▽ Active | Completed | Grant Total | |
| Information Request & Response | 3 | 42 | 45 | |
| General Monitoring | 1 | | 1 | |
| Implementation | 3 | | 3 | |
| Intercompany Agreements | 3 | | 3 | |
| Monitoring | | 1 | 1 | |
| Planning | 13 | 4 | 17 | |
| Product Sourcing | 9 | | 9 | |
| Grant Total | 32 | 47 | 79 | |

PivotTable Field List

Drag items to the PivotTable List

- Document
- Document Event Type
- Functional Area
- Process Definition
- Process Status
- Time
- Document Total
- Process Total

Add To | Row Area

FIGURE 17

| Process Total | Year | Status | | 2004 Total | Grant Total |
|---|---|---|---|---|---|
| | 2004 | | | | |
| Process Definition | Active | Completed | | | |
| Information Request & Response | 3 | 42 | | 45 | 45 |
| General Monitoring | 1 | | | 1 | 1 |
| Implementation | 3 | | | 3 | 3 |
| Intercompany Agreements | 3 | | | 3 | 3 |
| Monitoring | | 1 | | 1 | 1 |
| Planning | 13 | 4 | | 17 | 17 |
| Product Sourcing | 9 | | | 9 | 9 |
| Grant Total | 32 | 47 | | 79 | 79 |

480

PivotTable Field List

Drag items to the PivotTable List

- Document
- Document Event Type
- Functional Area
- Process Definition
- Process Status
- Time ← 462
- Document Total
- Process Total

Add To | Row Area

FIGURE 18

SCORECARD REPORTING SYSTEM

CROSS REFERENCE TO RELATED APPLICATIONS

This application is a Continuation of U.S. patent application Ser. No. 11/184,672, which is incorporated herein by reference in its entirety.

TECHNICAL FIELD

This invention relates generally to processing systems for collecting, processing, and presenting data, as well as monitoring business processes. More particularly, the invention relates to data processing systems for collecting tax and financial data, performing tax analysis, and presenting the results of the analysis.

BACKGROUND OF THE INVENTION

Large corporations typically have numerous facilities at various geographical locations. The physical separation of corporate facilities inevitably creates communication difficulties with the flow of information and data between dispersed employees and management. The addition of new facilities at different locations into the corporate body may create further challenges if a local network of a new facility cannot quickly become integrated into the corporate communication and information sharing network.

As a corporate structure increases in size and becomes more complex, the task distribution among personnel may become suboptimal. For instance, the duplicative creation and storage of critical documentation may be inconsistent, which degrades the ability of key personnel to access and retrieve reliable information and analysis in a timely manner. Moreover, multiple, non-reconciling sources of data may require the expenditure of extensive time to gather the data, as well as cleanse it for uniformity, accuracy, and completeness.

The growth of any business organization, and the increase in the accompanying structural complexities, may create difficulties for management to effectively run the business. For example, the infrequent collaboration among dispersed employees may prevent employees, as well as management, from taking advantage of existing documentation or specialized knowledge within the organization. Additionally, insufficient monitoring of business plans, strategies, and processes may result in uncertainty regarding the number and magnitude of the actual benefits that may be achieved and any associated risks.

Therefore, in any corporation or organization with dispersed facilities, there is a need for increased sharing of knowledge and communication between personnel, including both employees and management. There is also a need in general for improved data creation, storage, and subsequent access to large corporate databases, as well as enhanced monitoring of ongoing business processes.

The problem of communication and information sharing among dispersed employees and management may be exacerbated in organizational structures that maintain the tax and financial records and prepare tax reports and other financial documents or reports for the business entity. Accurate and reliable data is necessary to reduce the risk of financial errors that may create scrutiny from regulatory bodies, the financial markets, and the public. Additionally, any possible new acquisitions may present significant and complex tax ramifications for the corporate entity that require effective and efficient analysis, so that management may make well-informed decisions. Accordingly, the lack of information sharing, consistency, and communication presents a significant problem for modern businesses, particularly with regard to accurately monitoring and analyzing corporate tax health.

The present invention alleviates one or more of the shortcomings described above.

BRIEF SUMMARY

This invention provides a data processing system that facilitates monitoring and analysis of tax aspects of an organizational structure. The data processing system utilizes a Tax Scorecard that presents an easy to comprehend analysis of the particular aspects monitored. Raw financial data to be analyzed may be extracted from a data warehouse. The extracted data may be classified into a number of specific characteristics or perspectives desired to be monitored. Each perspective may have one or more related objectives, and each objective may have one or more related key performance indicators.

The tax scorecard provides high level analysis and monitoring of the status of each perspective, objective, and key performance indicator. The tax scorecard may present the analysis or summary using one or more scorecard display windows. Each scorecard window may report on a corresponding perspective. Each scorecard window may further provide the capability to drill down and access more detailed information regarding the corresponding perspective, as well as any objectives and key performance indicators associated with that perspective. The particular aspects monitored by the tax scorecard may vary with the desired application.

A data processing system for monitoring, analyzing, and reporting tax data includes a processor and a memory that includes a database of tax performance data. The data processing system also includes a metrics processing program that generates evaluated tax key performance indicators based upon the tax performance data, evaluated tax objectives based upon the evaluated key performance indicators, and multiple different tax perspectives based upon the evaluated tax objectives.

The processor generates a tax scorecard display that includes a tax scorecard having a tax scorecard window for each of the tax perspectives. Each tax scorecard window displays a tax perspective analysis including a tax perspective status indicator summarizing the tax perspective for that tax scorecard window, an evaluated tax objective underlying the tax perspective for that tax scorecard window, and an evaluated tax key performance indicator underlying the evaluated tax objective which in turn underlies the tax perspective for that tax scorecard window.

In another implementation, a data processing system for monitoring and analyzing tax data includes a processor and a network interface that receives a first tax performance data set organized by a first dimension set and a second tax performance data set organized by a second incompatible dimension set. The data processing system also includes a memory coupled to the processor comprising a unified database table organized as the merger of the first dimension set and the second dimension set. The table stores unified tax data comprising the first and second tax performance data sets.

The data processing system further comprises a metrics processing program that evaluates tax key performance indicators based upon the unified tax data in the unified database table, tax objectives based upon the key performance indicators, and a tax perspective based upon the tax objectives. The processor generates a tax scorecard user interface. The scorecard includes an tax perspective status indicator or trend indicator and tax perspective analysis based upon the tax perspective, an evaluated tax objective analysis associated with the tax perspective, and an evaluated tax key performance indicator associated with each evaluated tax objective.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are illustrative in nature and not restrictive.

BRIEF DESCRIPTION OF THE DRAWINGS

FIG. 5 illustrates an exemplary tax scorecard.

FIG. 6 illustrates an exemplary scorecard window.

FIG. 7 illustrates an exemplary detailed information window accessible from a scorecard window.

FIG. 17 illustrates a table view presenting data by dimension.

FIG. 18 illustrates a table view presenting data narrowed by dimension.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as stored in program, data, or multipurpose system memories, all or part of systems and methods consistent with the tax scorecard reporting system technology may be stored on or read from other machine-readable media, including secondary storage devices such as hard disks, floppy disks, and CD-ROMs; electromagnetic signals; or other forms of machine readable media either currently known or later developed.

Furthermore, although this specification describes specific components of a tax scorecard data processing system, methods, systems, and articles of manufacture consistent with the tax scorecard reporting system technology may include additional or different components. For example, a processor may be implemented as a microprocessor, microcontroller, application specific integrated circuit (ASIC), discrete logic, or a combination of other types of circuits acting as explained herein. Databases, tables, and other data structures may be separately stored and managed, incorporated into a single memory or database, or generally logically and physically organized in many different ways. The programs and metrics discussed below may be parts of a single program, separate programs, or distributed across several memories and processors.

The data processing system may provide a tax reporting graphical user interface that integrates multiple software tools to provide seamless communication and collaboration among systems and the people who use the systems. The graphical user interface may further provide transparency into an organization and enhance the management of business processes via advanced workflow tools. The graphical user interface may secure, integrate, and provide a single point of entry for all relevant content and resources, and support managing scale across all areas of an organization. A common repository for knowledge is provided that creates a single authoritative source for both data and documents. Both current and historical data for on-demand analysis and reporting may be accessible. The data processing system may facilitate getting the right information to the right people in a timely fashion and transform raw financial data into re-usable tax information and analysis.

Figure 1:
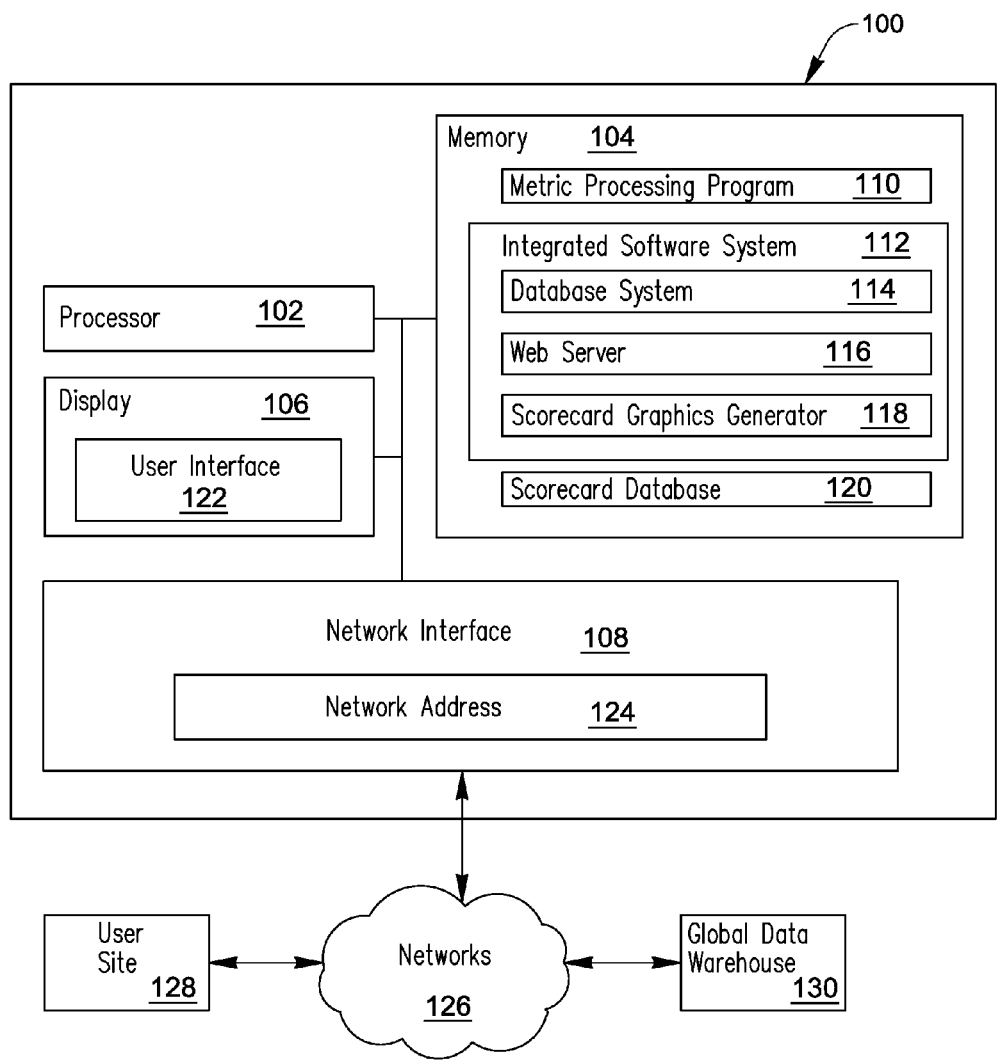
FIG. 1 shows a data processing system that implements the tax scorecard reporting system.

FIG. 1 shows a data processing system 100 that may implement a tax scorecard reporting system. The data processing system 100 includes a processor 102, a memory 104, a display 106, and a network interface 108. The data processing system 100 may have other configurations, including those with fewer or additional components.

The memory 104 may store a metrics processing program 110, an integrated software system 112, and a scorecard database 120. The processor 102 generates a user interface 122 on the display 106. The user interface 122 may provide a tax scorecard reporting interface that presents one or more processed tax metrics to a user logged into the data processing system 100. To that end, the metric reporting interface may include drill-down links distributed over one or more user interface screens that present the processed metrics in increasingly detailed or specific form.

The integrated software system 112 provides monitoring, summarizations, and analysis via a tax scorecard. The integrated software system 112 may include a database system 114, a web server 116, and a scorecard graphics rendering program 118. The integrated software system 112 may have other configurations, including those with fewer or additional components.

The web server 116 may provide access to an internal or external network 126. The web server 116 also may provide security and login functionality. The database system 114 may build and maintain the scorecard database 120. The database system 114 may receive data from a remote location via the web server 116, store, modify, or otherwise manipulate the data in the scorecard database 120. The scorecard graphics rendering program 118 may generate the graphics and text components of the tax scorecard, drill screens, or any other display elements.

In one implementation, the software system 112 may include off-the-shelf or customized software tools or components. The software tools may, with or without modification, provide functionality that supports the integrated software system 112. Applicable software tools include: (1) Windows 2003 Advanced Server™, (2) Microsoft Office 2003™ (Excel, FrontPage, Visio), (3) Microsoft Office Web Components™, (4) SQL Server 2000 SP3™, (5) SQL Server 2000 Analysis Services SP3™, (6) Windows SharePoint Services 2.0 SP1™, (7) Microsoft Office Business Scorecards Accelerator™, and (8) Microsoft Office 2003 Add-in: Web Parts and Components™. Additional, fewer, or different software tools or components may be employed with or without customization in the integrated software system 112. The integrated software system 112 design also may reflect specific needs, desired features, or requirements that arise from the data models or other system specifications.

The network interface 108 may include a network interface card or other network connection device to connect the data processing system 100 to one or more interconnected internal or external networks 126. Each network 126 may be an intranet, extranet, the Internet, a LAN, WAN, or other network. The network 126 may adhere to one or more network topologies and technologies. For example, the network 126 may be an Ethernet network, but in other implementations may be employed by another network technology.

The network interface 108 includes one or more network addresses 124. The network address 124 may include a packet switched network identifier such as a Transmission Control Protocol/Internet Protocol (TCP/IP) address (optionally including port numbers), Ethernet hardware address, or any other communication protocol address.

The networks 126 connect to one or more user sites 128. The user sites 128 may include endpoints such as computers, cell phones, and/or Personal Data Assistants communicating with other endpoints over a dial-up modem, DSL, T1, or other network connection with the data processing system 100. The user sites 128 may represent local or remote locations where a user may access the data processing system 100 from the network 126.

The data processing system 100 may access data sources such as a global data warehouse 130 via the network 126. The global data warehouse 130 may include a database that contains all of the network accessible data of a business entity. The database system 114 may extract selected data from the global data warehouse 130 for storage within the scorecard database 120. The data selected for extraction may pertain to a particular field, such as taxation or finance. Subsequently, the processor 102 may summarize, analyze, and report the extracted data stored within the scorecard database 120.

In one implementation, the data processing system 100 monitors, analyzes, and reports on taxation, finance, and business processes related to taxation and finance. The data processing system 100 may facilitate increasing the reuse and sharing of information by utilizing a central repository for data and documents, as well as automating processes within a tax or finance division of a corporate or business entity in order to reduce employee workloads.

As will be explained in more detail with regard to FIG. 5, the tax reporting system may present data and analysis on a tax scorecard upper level display screen. The tax scorecard upper level display screen may contain elements and functionality provided and supported by any windowing system interface including a title bar, a status bar, window maximize, minimize, close, move and other window controls and functionality. All of the windows may be designed using Hypertext Markup Language (HTML) and Active Server Pages (ASP). Any operating system, graphical user interface, and/or information markup and layout languages also may implement and support the tax scorecard upper level display screen.

Figure 2:
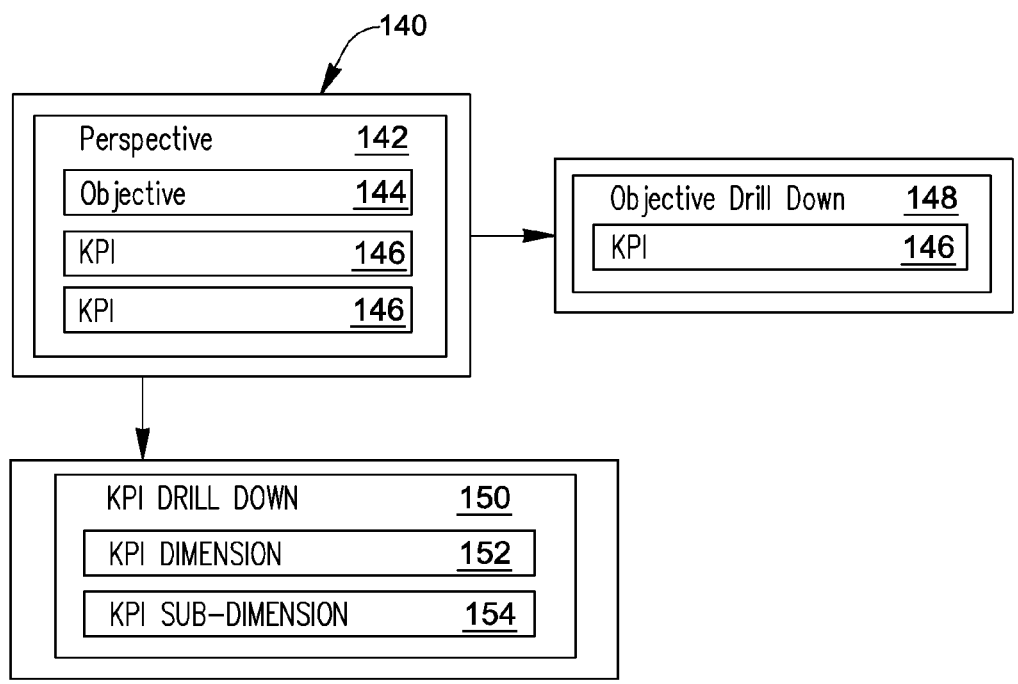
FIG. 2 shows an exemplary scorecard window that the tax scorecard reporting system may employ.

The tax scorecard upper level display screen may present data and analysis via one or more scorecard windows. FIG. 2 shows the initial components of a scorecard window 140. Each scorecard window 140 displays tax perspective analysis. To that end, each scorecard window 140 may present data and analysis pertaining to a perspective 142, one or more objectives 144 corresponding to or underlying the perspective 142, and one or more key performance indicators (KPI) 146 corresponding to or underlying the perspective 142 or an objective 144.

Each scorecard window 140 may represent a different higher level perspective 142 of information to be monitored and analyzed. A perspective 142 represents a high level view of or analysis of underlying data. The underlying data analyzed by a perspective 142 may be directed toward a certain type or grouping of data. A perspective 142 also may be directed toward a particular business function or the performance of a general aspect of an organization. Examples of perspectives 142 include: a 'tax excellence' perspective, a 'tax finance excellence' perspective, a 'tax business processes excellence' perspective, and a 'tax employee excellence' perspective. The unique view presented by each perspective 142 may be displayed on a scorecard window 140.

Each perspective 142 may have one or more related objectives 144 to be monitored and analyzed. Each objective 144 may be a goal intended to be achieved related to the perspective 142. Examples of objectives 144 for the tax excellence perspective include an effective tax rate objective and a tax budget objective.

Each objective 144 may have one or more related key performance indicators (KPI) 146 to be monitored and analyzed. A KPI 146 may be a statistical measure of performance that quantifies how well an organization is doing in a specific area. A KPI 146 may measure tax, financial, or other performance. A KPI 146 also may track and monitor the progress of existing business processes. An example of a key performance indicator for the effective tax rate objective is an effective tax rate indicator.

The identification of each perspective 142, objective 144, and key performance indicator 146 to be monitored and analyzed may depend upon the desired application. To build the perspectives 142, objectives 144, and key performance indicators 146, the data processing system 100 may access and obtain data from a global data warehouse or any other data source. The data processing system 100 may classify the data as applicable to one or more perspectives 142. In one implementation, the processing system 100 classifies the data as applicable to the 'tax excellence' perspective, 'tax finance excellence' perspective, 'tax business processes excellence' perspective, and/or 'tax employee excellence' perspective. The data processing system 100 may update the data on a routine basis, such as daily, weekly, monthly, quarterly, or annually.

While the tax scorecard upper level display screen may present a high level summary and analysis of the data for each respective perspective 142, a user may desire more detailed information. Accordingly, a user may drill down into each scorecard window 140 presented by the tax scorecard upper level display screen to access more detailed data and analysis.

The user may drill down and access more detailed information and analysis by clicking on buttons, bars, icons, or other user interface elements. The drill down capability may permit the user to view additional information about each perspective, objective, and key performance indicator. The drill down capability may permit a user to "slice" the respective data into segmented fields or dimensions, such that the viewing and ease of comprehension of the data may be enhanced. For instance, the data may be sliced by time, person, active processes, or written description. The characterization of the data or information displayed by perspectives, objectives, and key performance indicators may permit the user to quickly identify the origin of the data displayed and the implications of the summarizations and analysis presented.

FIG. 2 illustrates the drill down functionality of each scorecard window 140. Each scorecard window 140 may provide a link to an objective drill down page 148. An objective drill page 148 may be provided for each individual objective 144. The objective drill down page 148 may present more detailed data and analysis regarding the objective 144 and any KPIs 146 corresponding to that objective 144.

Each scorecard window also may provide a link to a KPI drill down page 150. Each KPI drill down page 150 may correspond to an individual KPI 146. Each KPI drill down page 150 may present more detailed data and analysis regarding the KPI 146 and associated KPI dimensions 152. Each KPI dimension 152 may include multiple sub-dimensions 154. The KPI dimensions 152 for a given KPI 146 may establish the trend or status of the KPI 146.

Figure 3:
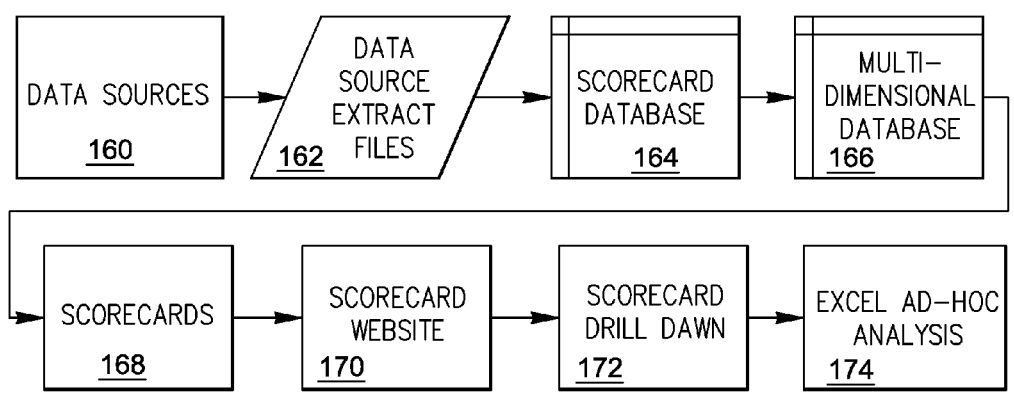
FIG. 3 illustrates data flow within the data processing system.

FIG. 3 shows the data flow within the data processing system 100. As illustrated, the data processing system may extract data from a global data warehouse 160. The extracted data 162 may be provided to the scorecard database 164. The scorecard database 164 may be subsequently arranged or organized by a number of dimensions 166 or database fields. The data processing system may use the multidimensional database 166 to summarize and analyze the extracted data into a number of scorecards 168.

The high level scorecards 168 may be displayed on a website 170 via an interconnected computer network, such as an intranet or the Internet. The data processing system may permit the user to drill down into each scorecard and associated scorecard drill down screens 172. The data processing system also may present further ad-hoc analysis 174 of the data, such as analysis provided by a pre-existing software tool/component or other software program.

The data processing system 100 may include custom components. The custom components may implement: (1) the processing of extracts into the SQL Server and Analysis Server databases, (2) the SQL Server database data model (regular database), (3) the Analysis Server database data model (multi-dimensional database), (4) the design of the scorecards and their components, (5) the design of the webpage that shows the scorecards, and (6) the combination of the scorecard(s) into an solution (e.g., the tax scorecard reporting system). The data processing system 100 may include additional, different, or fewer components.

The global data warehouse 160 may include tax performance data. The tax performance data may be arranged or structured as arrays having multiple dimensions or database fields. Additionally, each dimension may further be arranged or structured as an array of sub-dimensions or database subfields. However, the tax performance data corresponding to different key performance indicators may originate from different sources or data providers.

For example, the underlying data for an effective tax rate KPI may originate from a different source than the underlying data for a tax budget KPI (the effective tax rate KPI and the tax budget KPI are discussed below). The different data providers or sources may provide data sets arranged by data arrays of multiple data dimensions. However, the data sets may have different or unique dimensions, such that the arrays having multiple dimensions are not uniform. Hence, a virtual array may be used to consolidate data originated from different KPI data sources into a single, uniform multi-dimensional scorecard database.

A virtual array may contain every dimension present in all of the tax performance data sets. When two or more arrays having unique dimensions are consolidated, shared dimensions may be created corresponding to the unique dimensions identified. For instance, effective tax rate data and tax budget data from different sources may be consolidated into a tax perspective virtual array. The shared dimensions created may simply contain default data.

Table I below illustrates an exemplary virtual array of tax performance data using data sets that originated from different sources. The tax performance data from each source is arranged as an array of dimensions. Each of the arrays includes at least one unique dimension. The data processing system 100 identifies the dimensions from each data source that are unique. The data processing 100 subsequently creates a corresponding shared dimension in the tax performance data structures received from the remaining data sources.

TABLE I

| ETR Array Dimensions | Tax Budget Array Dimensions |
| --- | --- |
| Scenario | Scenario |
| Time | Time |
| *New Shared Dimension | Account Category |
| Currency | *New Shared Dimension |
| Entry Type | *New Shared Dimension |
| Reporting Unit | *New Shared Dimension |
| Market Flag | *New Shared Dimension |
| Company Organization | *New Shared Dimension |

In Table I, the ETR Array Dimensions contain tax performance data related to an effective tax rate (ETR) KPI. The ETR Array Dimensions include Scenario, Time, Currency, Entry Type, Reporting Unit, Market Flag, and Company Organization dimensions. The Tax Budget Array Dimensions include Scenario, Time, and Account Category dimensions.

As shown, the Account Category dimension is unique to the Tax Budget Array. Accordingly, a corresponding new shared dimension is created in the ETR Array. Additionally, the Currency, Entry Type, Reporting Unit, Market Flag, and Company Organization dimensions are unique to the ETR Array. Therefore, corresponding new shared dimensions are created in the Tax Budget Array. Additional, fewer, or alternate unique and shared dimensions also may be identified and created, respectively.

The analysis and reporting functionality provided by the data processing system 100 may be accessed from a login screen. The login screen may provide username and password security before access to subsequent screens or portals is granted. The login screen itself also may provide a number of messages and links to websites, search engines, or other portals for which no permission or authorization is required.

After successful login, an optional initial homepage 200 may be displayed. In the example illustrated in FIG. 4, the optional homepage 200 is entitled "My Tax Page." The optional homepage 200 may provide access to a corporate or business entity tax or finance department, as well as associated tax and financial transformation tools. The optional homepage 200 may provide users with access to portals, key links, work items, and information directly related to a particular user. The homepage 200 also may provide general information that will be displayed for all users within a corporate division, department, or other group of personnel.

Figure 4:
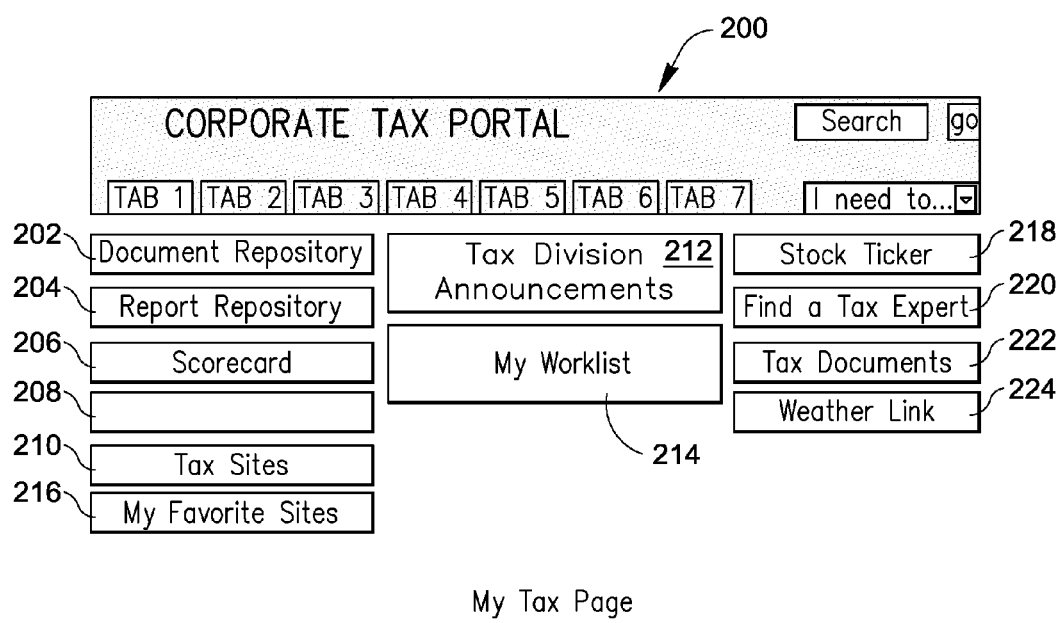
FIG. 4 illustrates an exemplary optional initial homepage.

The optional homepage 200 may provide access to other features or metrics. For the example shown, the optional homepage 200 includes a Document Repository portal 202, a Report Repository portal 204, a Tax Scorecard Portal 206, a Tax Information System portal 208, a Useful Sites portal 210, a Tax Division Announcements portal 212, and a My Worklist portal 214. The optional homepage 200 illustrated also includes a Favorite Sites link 216, a Stock Ticker link 218, a Find a Tax Expert link 220, a Tax Documents link 222, and a Weather link 224. Additional, fewer, or alternate features also may be displayed or accessible via the optional homepage 200. Table II below further details each portal and component for the exemplary optional homepage 200 illustrated in FIG. 4.

the example of FIG. 4. The Document Repository portal 202 may permit a user to locate, view, edit, and save documents. The Report Repository portal 204 may permit a user to view reports. The Useful Sites and My Favorite Sites portals 210, 216 may provide integrated links for research.

The Announcements portal 212 may facilitate communication and collaboration between users. The My Worklist portal 214 may provide a worklist that contains personal assignments and notifications. A search feature also may be provided that permits a user to search the Document Repository 202, internal sites, or the internet. The Tax Templates portal 226 may provide links to frequently used or standard templates. Additional, fewer, or alternate portals and features also may be provided on the optional homepage 200.

TABLE II

| Component Name | Layout Location | Basic Functionality Description |
| --- | --- | --- |
| Document Repository Portal | Left | Provides a link to an application with which a user will be able to locate, view, edit, and save documents. |
| Report Repository Portal | Left | Provides a link to a reports application, with which a user will be able to view reports |
| Tax Scorecard Portal | Left | Provides a link to the tax scorecard, a management reporting application, with which a user will be able to view system metrics |
| Tax Information System Portal | Left | Provides a link to a tax information system application, with which a user may manipulate tax data |
| Useful Sites Portal | Left | Provides a list of links targets for an entire tax division. |
| My Favorite Sites | Left | Displays a list links defined by the user. |
| Tax Division Announcements Portal | Center | Lists Announcements related to the entire tax division. All users may see the same or different division-wide announcements on their personal "My Tax Page." |
| My Worklist Portal | Center | This portal lists work items that have been assigned to the user through an activity in a business process. Clicking on a work item brings the user to a work item handler where they can complete the activity. |
| Stock Ticker | Right | Displays the current stock price. |
| Find a Tax Expert Search | Right | Displays the name and contact information of a relevant tax expert, based on the search criteria entered by the user. |
| Tax Documents Portal | Right | This portal will provide the user with a list of items that have been found by a crawler pointing to a specific folder. |
| Weather Link | Right | This portal will consist of a link to a weather website. |
| Tax Template | Right | Provides links to frequently used templates. |

The optional homepage 200 illustrated in FIG. 4 provides document management and business management portals. The document management portals may provide links to one or more document management applications that permit a user to locate, view, edit, and save tax and financial documents. The document management portals also may provide links to applications that permit users to view tax and financial reports. The business management portal may provide a list of work items assigned to a user.

Additionally, the optional homepage 200 may provide a communication portal that lists announcements. The announcements may be limited to a specific corporate division or department. The optional homepage 200 also may provide links for research, frequently used templates, or search engines capable of searching an intranet or the internet.

The optional homepage 200 may have an upper control bar that provides access to different functional pages, such as the Planning, Audit, and Compliance functional pages shown in The data processing system 100 permits a user to access the tax scorecard. The tax scorecard may be accessed by clicking on a button, bar, or icon located on an optional homepage 200. Alternatively, the data processing system 100 may provide direct access to the tax scorecard.

The tax scorecard may present one or more scorecard windows. For instance, the tax scorecard may have four scorecard windows or scorecard quadrants. Each of the scorecard windows may be dedicated to a tax perspective. Moreover, a single display of a graphical user interface may display any number of the scorecard windows. A scorecard window may display a tax perspective that includes data and analysis pertaining to a tax perspective, associated objectives, and associated tax key performance indicators.

A tax perspective represents a unique high level view of or analysis of underlying tax data. In one implementation, the tax scorecard may present a 'tax excellence' perspective, a 'tax finance excellence' perspective, a 'tax business process excellence' perspective, and a 'tax employee excellence' perspective.

The 'tax excellence' perspective may monitor tax data and present associated summarizations and/or analysis. The 'tax excellence' perspective may monitor data and present analysis regarding effective tax rates, internal tax budgets, or any other tax related metric or objective.

The 'tax finance excellence' perspective may monitor tax and finance data and present associated summarizations and/or analysis. The 'tax finance excellence' perspective may track finance key performance indicators that indicator if a company's financial data is affected by or directly affects the company's tax division. The 'tax finance excellence' perspective may monitor data and present analysis regarding income before taxes, rating agency liquidity ratios, any other tax related finance aspect.

The 'tax business process excellence' perspective may monitor the status of internal tax business processes and present associated summarizations and/or analysis. The 'tax business process excellence' perspective may track the company's tax division usage of technology to increase process efficiency and knowledge sharing. Additionally, the 'tax business process excellence' perspective may monitor data and present analysis regarding active tax business processes, completed tax business processes, tax documents contributed to a database, and tax documents accessed. The business processes monitored may include processes related to product sourcing, planning, monitoring, implementation, intercompany agreements, information request and response, general monitoring or other business activities.

The 'tax employee excellence' perspective may gather employee knowledge and opinion information via employee surveys and present associated summarizations and/or analysis. The employees perform tax related jobs, functions, and tasks. The 'tax employee excellence' perspective may focus on certain aspects of professional development of tax division or department personnel. The 'tax employee excellence' perspective may monitor data and present analysis regarding cross-functional corroboration between work groups, allocation of time, communication in the workplace, performance feedback, and professional growth.

Each scorecard window may have a number of components. The components may include a menu for altering display options, a perspective to be monitored or analyzed, one or more objectives associated with the perspective, and one or more key performance indicators associated with each objective or perspective.

Each scorecard window also may present the previous state, the current state, the target, the status, and the trend for each perspective, objective, or key performance indicator. Each perspective, objective, or key performance indicator may have a status indicator that is a summary indicator, such as a red, green, or yellow indicator, or a trend indicator, such as an arrow or direction indicator. Additional, fewer, or alternate status and trend indicators also may be used.

Each scorecard window may provide access or a link to more detailed information, such as charts that display data in graphical format for ease of viewing and comprehension. Additionally, each scorecard window may provide access to or a link to tables that display data in a table format for ease of viewing and comprehension. Further drill down functionality also may be provided. For example, each chart or table may have an associated pop-up window that permits a user to drill down into the data and view the desired data by specific criteria or field. The specific criteria may correspond to the dimensions and sub-dimensions by which the tax performance data is arranged. The user also may be permitted to view data by dimensions and sub-dimensions in a worksheet format. The data presented may be saved, printed, or emailed.

Each of the components of a scorecard window, such as the perspective, the corresponding objective(s), and the corresponding KPI(s), may have an associated link that accesses a window displaying detailed underlying information. The information may include attribute information regarding a number of attributes of the associated perspective, objective, or KPI. The attribute information may include attribute names and corresponding attribute value(s).

The detailed information also may include status and boundary information. The status and boundary information may explain levels, indicators, and boundaries. The boundaries may determine what level and/or indicator a perspective, objective, or KPI is assigned. Additional, fewer, or alternate types of detailed information also may be presented.

FIG. 5 illustrates an exemplary Tax Scorecard 300. In the example shown in FIG. 5, the Tax Scorecard 300 includes four scorecard windows 302, 304, 306, 308. Each window 302, 304, 306, 308 presents a specific tax perspective analysis display.

The first scorecard window 302 is dedicated to the Tax Excellence perspective. The second scorecard window 304 is dedicated to the Finance Excellence perspective. The third scorecard window 306 is dedicated to the Business Process Excellence perspective. The fourth scorecard window 308 is dedicated to the Employee Excellence perspective. In other words, each scorecard provides insight into the tax status of an organization from a different perspective. The data processing system may monitor data and present analysis related to additional, fewer, or alternate perspectives using additional or fewer scorecard windows. The data processing system also may present data and analysis via one or more screen pages that are not divided into quadrants.

Each scorecard window rates or "scores" the performance or status of each perspective using a status indicator 322. Each perspective may have one or more corresponding objectives (e.g., the manage effective tax rate objective 310). Moreover, each objective may have one or more related key performance indicators (KPI) (e.g., the effective tax rate indicator 312). The performance or status of each objective also may be rated within the corresponding scorecard window 302 by a status indicator. The status indicator may change color or shape to covey the current status. For example, a green "go" light icon may represent a positive status or improving performance, a red "stop" sign icon may represent a negative status or worsening performance, and a yellow "yield" sign icon may represent an intermediate status or steady performance.

Each scorecard window also may reflect the current trend using a trend indicator 320 for a perspective, an objective, or a KPI. As shown by FIG. 5, the current trend 320 may be represented by rising, horizontal, or declining directional arrows to indicate improving, steady, or worsening performance. Each scorecard window also may show the previous state 314, the current state 316, or the target 318 for a perspective, an objective, or a KPI.

In the example of FIG. 5, the first scorecard window 302 dedicated to the Tax Excellence perspective has two corresponding objectives 310 and 311: "Manage Effective Tax Rate" and "Manage Budget." The Manage Effective Tax Rate objective 310 facilitates accurately managing the effective tax rate. The Manage Effective Tax Rate objective 310 has one corresponding KPI 312, entitled "Effective Tax Rate." The Effective Tax Rate KPI 312 tracks the tax rate for a company or business entity.

The Manage Budget objective 311 facilitates monitoring and managing the tax division's internal budget. The Manage Budget objective 311 has one corresponding KPI 312, entitled "Tax Budget." The Tax Budget KPI 313 tracks the tax division's internal budget.

The second scorecard window 304, dedicated to the Finance Excellence perspective, has one corresponding objective 340, entitled "Monitor Financial Data." The Monitor Financial Data objective 340 facilitates monitoring tax related financial data to obtain insight into the management reporting side of a business or company. The Monitor Financial Data objective 340 has two corresponding KPIs 342 and 344: "Income Before Taxes (IBT)" and "Rating Agency Liquidity Ratio." The Income Before Taxes (IBT) KPI 342 monitors income before taxes from the perspective of a management-level business person. The Rating Agency Liquidity Ratio KPI 344 provides insight into the ratio of cash flow to debt for a company, department, or division.

The third scorecard window 306, dedicated to the Business Process Excellence perspective, has two corresponding objectives 346 and 348: "Increase Process Efficiency" and "Increase Knowledge Sharing." The Increase Process Efficiency objective 346 facilitates a collaborative work environment that utilizes technology to increase efficiency. The Increase Process Efficiency objective has two corresponding KPIs 350 and 352: "Active Processes" and "Completed Processes." The Active Processes KPI 350 tracks the number of tax related business processes that have been initiated and are currently in progress. The Completed Processes KPI 352 tracks the number of tax related business processes that have been completed within the specified timeframe.

The Increase Knowledge Sharing objective 348 also facilitates encouraging a collaborative work environment through knowledge sharing. The Increase Knowledge Sharing objective 348 has two corresponding KPIs 354 and 356: "Documents Contributed" and "Documents Accessed." The Documents Contributed KPI 354 tracks the number of tax related documents contributed into the document management system. The Documents Accessed KPI 356 tracks the frequency that the tax related documents in the document management system are being accessed by members of the tax division.

The fourth scorecard window 308, dedicated to the Employee Excellence perspective, has three corresponding objectives 358, 360, and 362: "Encourage High Performers," "Improve Communication," and "Encourage Learning & Growth." The Encourage High Performers objective 358 facilitates a collaborative work environment through tax related knowledge sharing. The Encourage High Performers objective 358 has two corresponding KPIs 364 and 366: "Cross-Function Collaboration" and "Allocation of Time." The Cross-Function Collaboration KPI 364 tracks the level of tax related knowledge sharing across functional areas. The Allocation of Time KPI 366 tracks the amount of time spent on tax related tasks that do not directly correlate with the employee's yearly/semi-yearly objectives.

The Improve Communication objective 360 facilitates communication within the tax division. The Improve Communication objective has one corresponding KPI 368, entitled "Communication." The Communication KPI 368 tracks the opportunity that tax personnel have for discussion with supervisors and other members of management, as well as the quality of the communication.

The Encourage Learning & Growth objective 362 facilitates continuous learning and professional development. The Encourage Learning & Growth objective 362 has two corresponding KPIs 370 and 372: "Performance Feedback" and "Growth." The Performance Feedback KPI 370 tracks the frequency of performance feedback of tax personnel, both formal and informal feedback. The Growth KPI 372 tracks the opportunities for growth within the tax division and the level of understanding pertaining to the steps necessary to advance within the tax division. Each of the scorecard windows may monitor data associated with and provide analysis for additional, fewer, or alternate perspectives, objectives, and key performance indicators.

FIG. 6 illustrates an alternate embodiment of a scorecard window dedicated to the Business Process Excellence perspective 306. As illustrated in the example of FIG. 6, the scorecard window dedicated to the Business Process Excellence perspective 306 also may indicate the target 318 and the status by a status indicator 322, as opposed to the trend, of the perspective, each corresponding objective 346, 348 and each corresponding KPI 350, 352, 354, 356.

FIG. 7 illustrates an exemplary detailed information window accessible from a scorecard. In the example shown, the detailed information for the Increase Process Efficiency objective 346 associated with the Business Process Excellence perspective is displayed. The detailed information may include attribute information describing a perspective, objective, or key performance indicator. The attribute information may include attribute names 380 and attribute values 382. The attribute names 380 displayed include (1) KPI Group Name, (2) Description, (3) Contact Name, (4) Additional Documents, (5) Weight, (6) Indicator, (7) Created, and (8) Last Updated. The corresponding attribute value 382 for each attribute name 380, if any, is also shown. Each objective may have additional, fewer, or alternate attribute names and values.

The corresponding objective(s), and the corresponding KPI(s), may have a status indicator 384 displayed on the associated scorecard. The detailed information may explain that indicator 384. For example, the status of each perspective, objective, or KPI may be characterized into levels 386, each different level 386 representing a measure of performance, such as good, satisfactory, and poor or 1, 2, and 3. The detailed information also may define the boundaries 388 and indicators 384 representing each level 386. In the example of FIG. 7, a red "stop sign" icon indicates poor performance, a yellow "caution sign" icon indicates satisfactory performance, and a "green go light" icon represents good performance.

Figure 8:
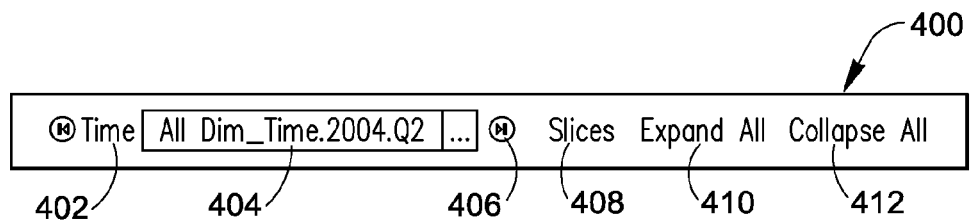
FIG. 8 illustrates a control bar that provides display options for a scorecard window.

As illustrated in FIG. 8, each scorecard window may have a control bar 400 that provides a user with access to various display options. For the example shown, the display options may include a Previous Time Period Dimension Slicer 402, a Time Period Dimension Slicer 404, a Next Time Period Dimension Slicer 406, a Slices hyperlink 408, an Expand All hyperlink 410, and a Collapse All hyperlink 412. The control bar may provide additional, fewer, or alternate display options.

Figure 9:
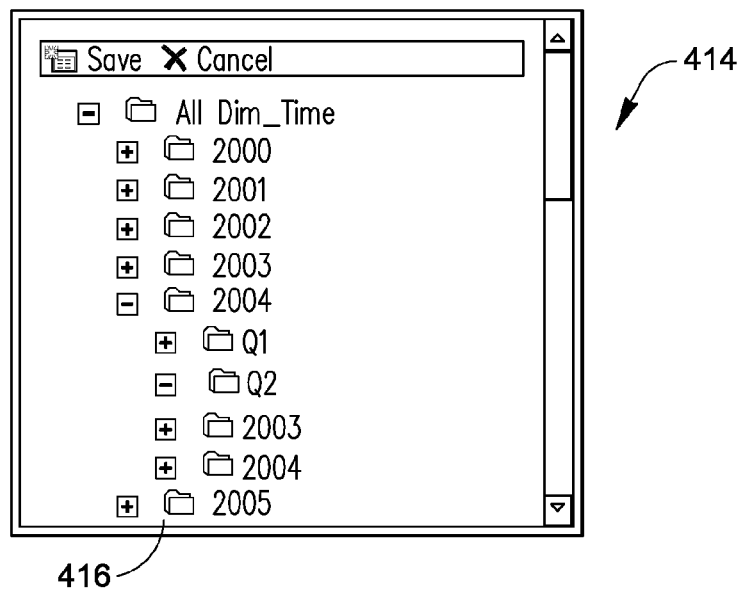
FIG. 9 illustrates selectable time periods available over which data may be analyzed.

A time dimension slicer feature allows a user to conveniently and efficiently view data and analysis for a given "slice" of time. For example, the user may click on a button or icon associated with the Time Period Dimension Slicer 404 to select a specific time period to view via the respective scorecard window. By clicking on the button or icon, a pop-up window may appear, such as the pop-up window 414 displayed in FIG. 9. The example of FIG. 9 illustrates that the time periods may be represented by folder icons 416. The time periods may be broken down by year, quarter, month, week, day, or other time period. The user may select a desired time period by positioning the cursor over and clicking on the desired time period folder icon 416 containing the data desired to be viewed and analyzed. Subsequently, the time period may be automatically updated when the user clicks on the Save button.

Figure 10:
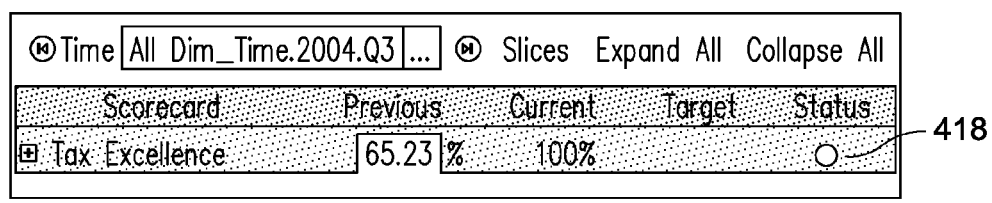
FIG. 10 illustrates the scorecard window in a collapsed state.

Once a time period is selected, the user may use forward and backward buttons to view previous or future time periods. For the example illustrated in FIG. 8, the user may click on a button associated with the Previous Time Period Dimension Slicer 402 to view the previous time period. The user may click on a button associated with the Next Time Period Dimension Slicer 406 to view the next time period. The user may click on a button associated with the Slices hyperlink 408 to view the current time period. The user may click on a button associated with the Expand All hyperlink 410 to expand all key performance indicators (this may be the default view for each scorecard window). The user may click on a button associated with the Collapse All hyperlink 412 to collapse all data rows except the Perspective bar 418, as illustrated by the example shown in FIG. 10.

Each scorecard may provide a number of ways to view detailed data associated with each corresponding key performance indicator, such as in a tax key performance indicator report. The tax key performance indicator report may a presented as a table view or a chart view. The table view may provide a view of the detailed key performance indicator data or analysis arranged in a table. The table view may list a number of dimensions within the associated KPI and present the status of each dimension. Each dimension pertains to a specific criteria by which the tax data and analysis may be presented. The table view may allow the user to drill down into the data to view more detailed data and analysis by dimension or related sub-dimension. Each table also may have a corresponding table field list presenting selectable dimensions or sub-dimensions by which the detailed data and analysis may be arranged.

On the other hand, the chart view may provide a view of the detailed key performance indicator data or analysis arranged in a chart. The chart view also may list the dimensions and sub-dimensions of the KPI and present the status of each dimension. Each scorecard may provide additional, fewer, or alternate methods of viewing the detailed key performance indicator data and analysis.

Figure 11:
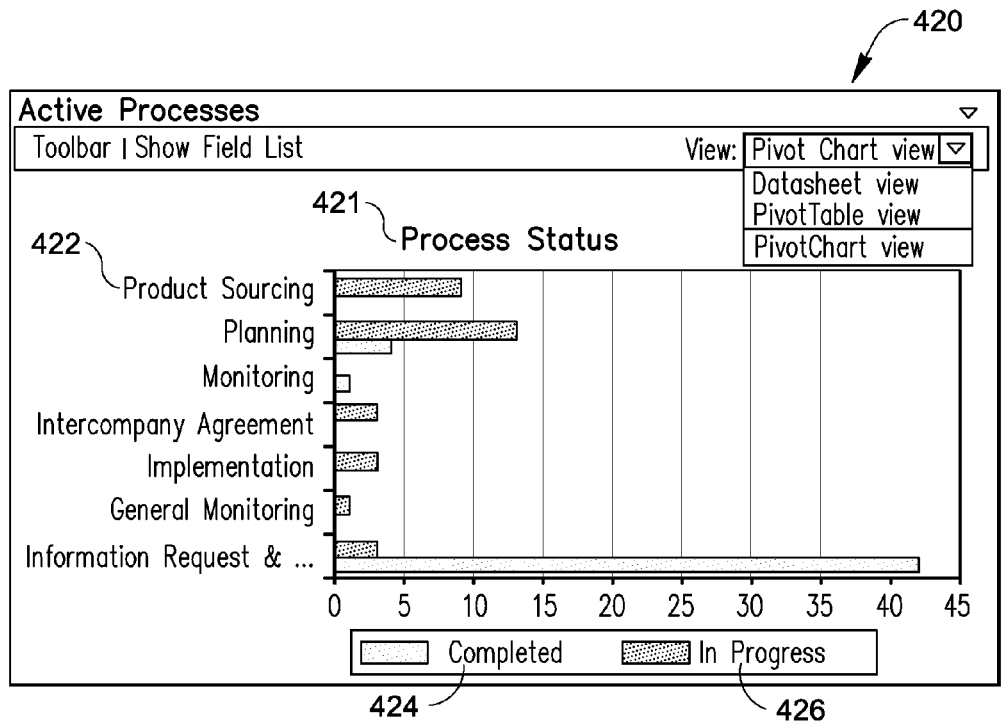
FIG. 11 illustrates an exemplary chart view of data associated with a key performance indicator.

FIG. 11 shows a chart view 420 of a key performance indicator. In the example illustrated, a chart view 420 is provided corresponding to the Active Processes KPI associated with the Business Process Excellence perspective. The chart view 420 displays the data corresponding to an Active Processes KPI dimension, specifically the Process Status dimension 421. The Process Status dimension 421 is arranged by a number of Active Processes KPI sub-dimensions 422. As shown, each business process monitored may be determined to belong to one of the KPI sub-dimensions 422. The KPI sub-dimensions 422 illustrated include (1) Product Sourcing, (2) Planning, (3) Monitoring, (4) Intercompany Agreements, (5) Implementation, (6) General Monitoring, and (7) Information Request & Response. Additional, fewer, or alternate KPI dimensions and sub-dimensions also may be monitored and analyzed.

The chart view 420 may be color coded. For example, portions of each KPI sub-dimension may be characterized differently and each type of KPI characterization may be indicated by shading. The number of each type of KPI characterization may be graphically represented, such as by a bar chart. Additionally, each sub-dimension of a KPI may have a number of bars, each bar representing the magnitude of items within a different type of KPI characterization.

For the example shown in FIG. 11, the processes for the Active Processes KPI that are "completed processes" 424 are lightly shaded, while the processes that remain "in progress" 426 are darkly shaded. Each of the sub-dimensions 422 may have a number of corresponding processes that are completed and a number of corresponding processes that are in progress, such as the Planning and Information Request & Response sub-dimensions 422 shown.

The table view also may show KPI dimensions and sub-dimensions. The table view may provide a table showing the status of each KPI dimension and sub-dimension. The table view may provide the user with the ability to customize the table to view the data by one or more selectable dimension or sub-dimension.

Figure 12:
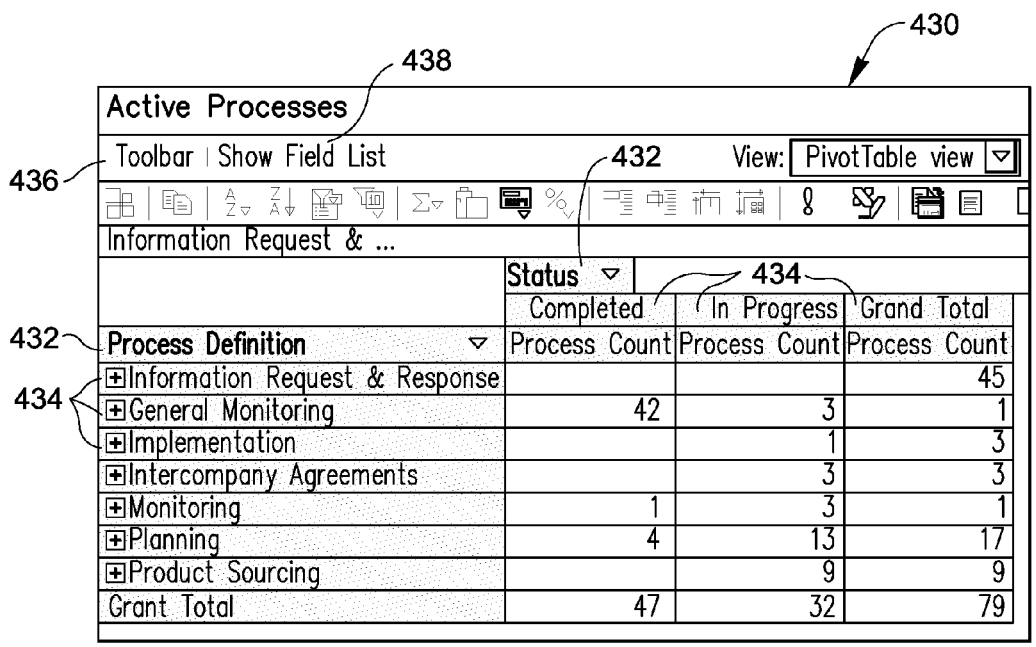
FIG. 12 illustrates an exemplary table view of data associated with a key performance indicator.

FIG. 12 shows a table view 430 of one key performance indicator. In the example illustrated, a table view 430 is provided corresponding to the Active Processes KPI associated with the Business Process Excellence perspective. As shown, the table displays data arranged by a number of KPI dimensions 432 and sub-dimensions 434.

The KPI dimensions 432 shown include the Process Definition and Process Status dimensions. The Process Definition dimension 432 includes (1) Information Request & Response, (2) General Monitoring, (3) Implementation, (4) Intercompany Agreements (5) Monitoring, (6) Planning, and (7) Product Sourcing sub-dimensions. The Process Status dimension 432 includes (1) Completed, (2) In Progress, and (3) Grand Total sub-dimensions. Additional, fewer, or alternate KPI dimensions and sub-dimensions also may be monitored.

The table view 430 example of FIG. 12 includes two buttons, the Toolbar button 436 and the Show Field List button 438, which may allow the user to customize the table view 430 and view the data by selectable dimension or sub-dimension. By clicking on the Toolbar button 436, a toolbar may be displayed below the Toolbar button 436. The toolbar may provide several buttons that may be used to configure the table view 430.

Figure 13:
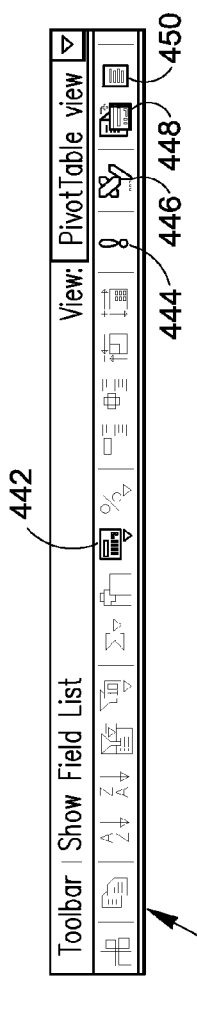
FIG. 13 illustrates a toolbar associated with a table view.

FIG. 13 illustrates an example of a toolbar 440 associated with a table view. The toolbar 440 may have a Calculated Totals and Fields button 442, a Refresh Data button 444, an Export button 446, a Commands and Options button 448, and a Field List button 450. The toolbar 440 may have additional or fewer buttons, as well as buttons with alternate corresponding functions.

The Calculated Totals and Fields button 442 may permit the user to create new totals based on the data in the table. The Refresh Data button 444 may permit the user to update the data in the table. The Export button 446 may allow the user to export the data in the table to a spreadsheet. The Commands and Options button 448 may permit the user to configure the view of the table. The Field List button 450 may display a list of the data supporting the table and allow the user to view the data by dimension or sub-dimension.

A table field list may present a list of selectable dimensions and sub-dimensions. By clicking on a specific dimension or sub-dimension icon, via a mouse or other input device, the table may be reconfigured to display the data arranged by the dimension or sub-dimension selected. The data may be presented or arranged by more than one user selected dimension or sub-dimension. Alternate ways to access a table field list also may be used.

Figure 14:
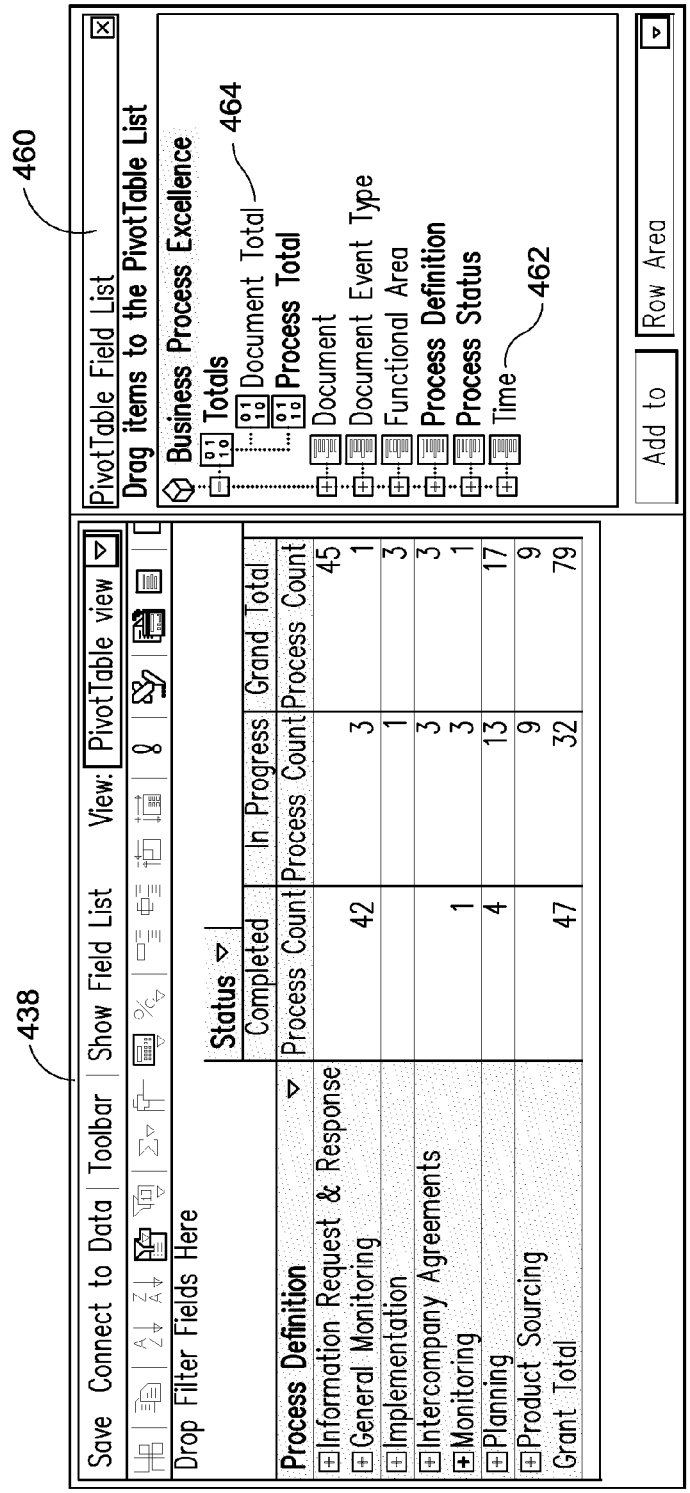
FIG. 14 illustrates an exemplary table view of data associated with a key performance indicator.

FIG. 14 illustrates a table field list 460 for the Business Process Excellence perspective. The table field list 460 may be accessed from the Show Field List button 438. Accessing the field list feature, such as by clicking on the Show Field List button 438, may display a pop-up window. The table field list 460 may be displayed inside of the pop-up window. The table field list 460 may include all of the dimensions 462 and corresponding sub-dimensions 464 in the table for a particular perspective, objective, or key performance indicator for which data is available for viewing.

FIG. 14 further illustrates that the dimensions 462 by which data may be viewed for the Business Process Excellence perspective include a Totals, a Document, a Document Event Type, a Functional Area, a Process Definition, a Process Status, and a Time dimension 462, as well as a Document Total and a Process Total sub-dimension 464. Additional, fewer, or alternate dimensions and sub-dimensions also may be utilized.

For each dimension 462 or sub-dimension 464 for which data may be arranged by, the dimension 462 or sub-dimension 464 icon may be highlighted in the table field list 460. As shown, in the example of FIG. 14, the Totals, the Process Definition, and the Process Status dimensions 462 are highlighted. The Process Total sub-dimension 464 is also highlighted. Accordingly, the table 432 in the example shown presents data arranged by the Process Status and the Process Definition dimensions and the Process Total sub-dimension.

Figure 15:
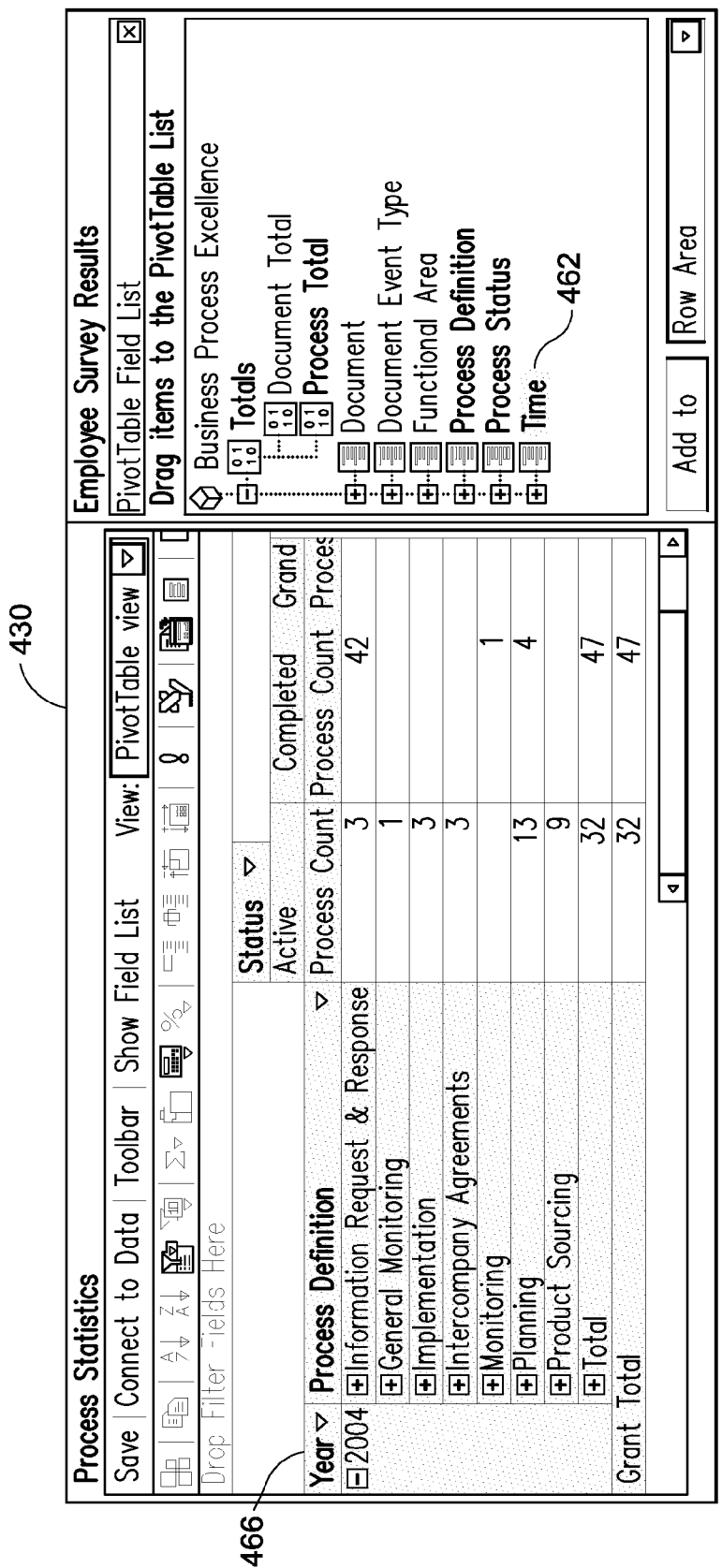
FIG. 15 illustrates a table view presenting data by dimension.

FIG. 15 illustrates updating the table view 430 to view data by another dimension 462 or sub-dimension 464. By clicking on a dimension 462 or a sub-dimension 464, via a mouse or other input device, the table view 430 is updated to reflect data arranged by the dimension 462 or sub-dimension 464 selected. For the example shown, the Time dimension 462 is selected and the table view 430 is updated to present data arranged by the current Time sub-dimension selected 466, such as the year.

The Export feature may allow the user to view the data by dimension in a worksheet format. A user also may save, print, and email the table. The Export feature may be accessed by clicking on the Export Worksheet button 446. Subsequently, the data will be automatically exported in a pre-selected work sheet format. A dialogue box may ask if the data should be automatically refreshed. After which, the data may be loaded into the worksheet.

Figure 16:
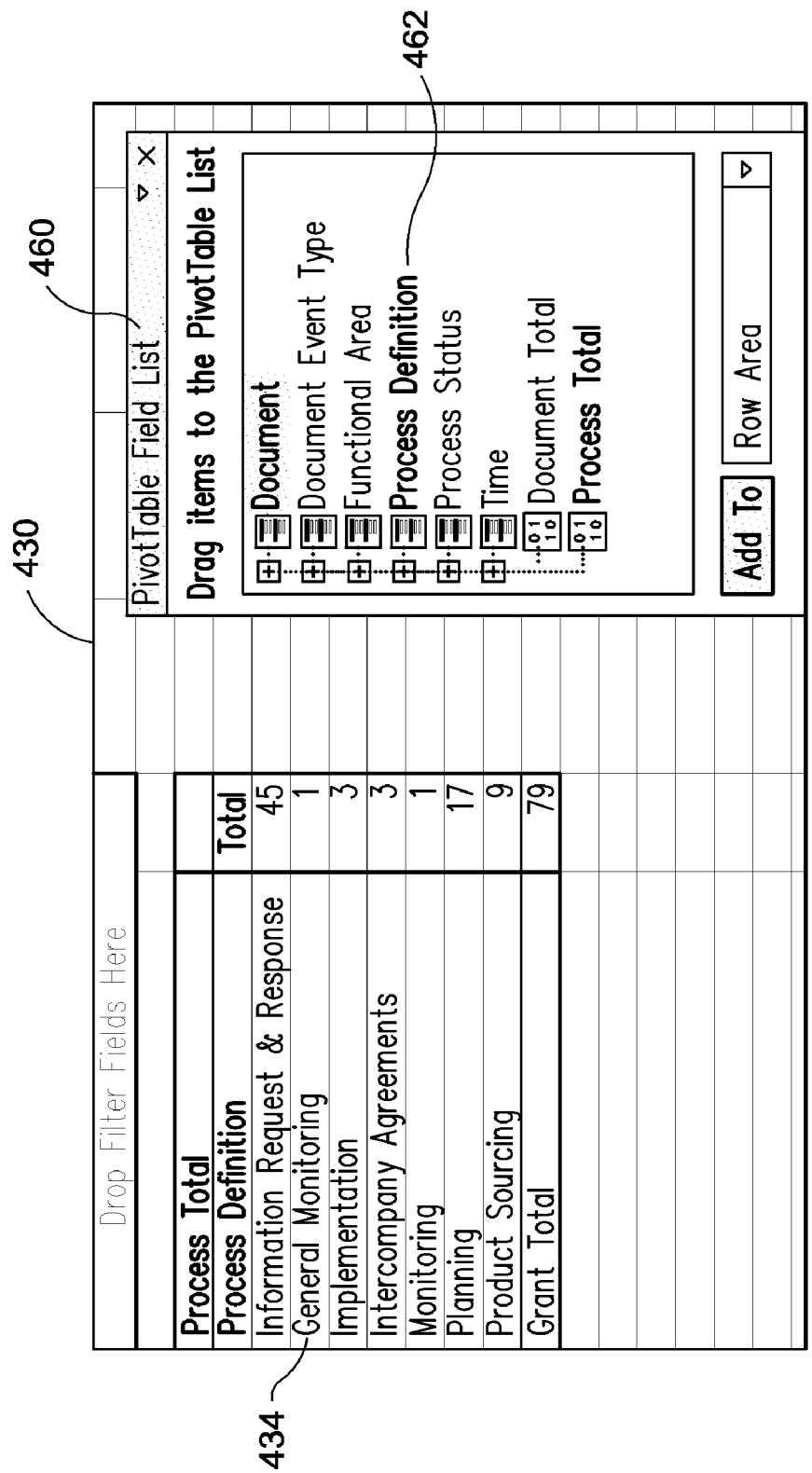
FIG. 16 illustrates a table view presenting data by dimension.
Figure 19:
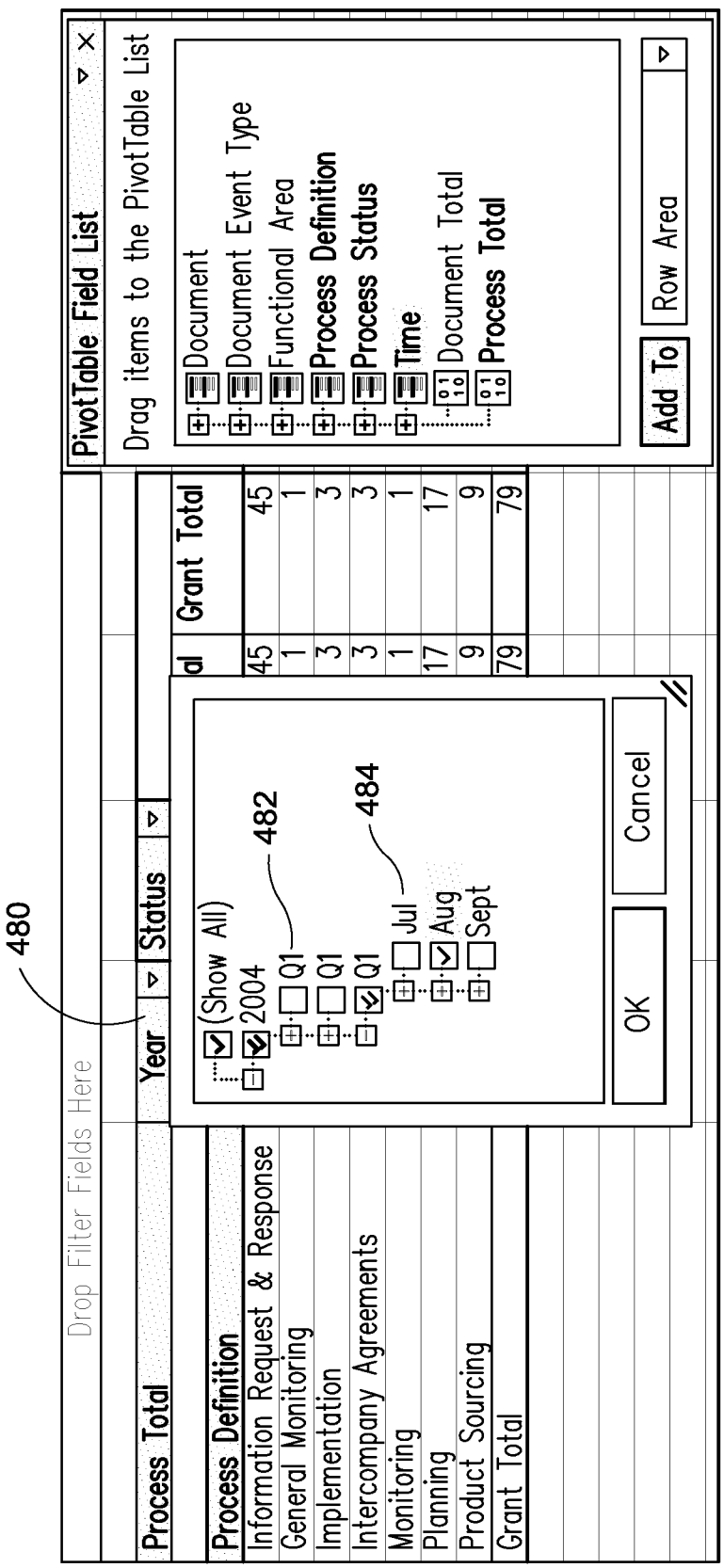
FIG. 19 illustrates further filtering a table view by dimension.

FIG. 16 illustrates another exemplary table view 430 of data arranged by dimension 462. The table 430 may be accessed directly from a scorecard or by using the export to worksheet functionality. As shown in FIG. 16, initially the data presented is arranged by the Process Definition and the Process Total dimensions 462. Accordingly, the total number for each Process Definition sub-dimension 434 is displayed.

FIG. 17 illustrates another exemplary table view 430 of data arranged by dimension 462. By clicking on the Process Status dimension 462 icon, the table view 430 may be reconfigured to present the data by another dimension, specifically the Process Status dimension 470. The Process Status dimension 470 may illustrate Active, Completed, and Grand Total sub-dimensions 472, 474, 476. The number of business processes relating to each Process Definition sub-dimension 434 may be characterized as either active or completed and arranged by Active or Completed Process Status sub-dimension 472, 474.

As shown by FIG. 17, the data and analysis presented may be arranged in accordance with a number of selectable data dimensions 462. Additional data dimensions 462 also may be selected to further filter or narrow the data. FIG. 18 illustrates an example in which the table view 432 is narrowed further by the Time dimension 462. Again, by clicking on the Time dimension 462 icon, the data and analysis presented may be narrowed according to the current Time sub-dimension selected 480, such as the year in this example. FIG. 18 illustrates that the data and analysis may be further filtered according by a Time sub-dimension selected, such as by quarter or month sub-dimension 482, 484.

The data dimension by which a user may view data and analysis may correspond to the data dimensions previously mentioned with respect to Table I during the discussion of the creation of a single scorecard database from a plurality of data sources. In other words, drill down options may permit a user to drill down into user driven and selectable dimensions associated with each perspective virtual array to view data and analysis arranged by data dimensions and sub-dimensions.

For instance, referring back to FIG. 5, the Tax Excellence perspective may have two corresponding key performance indicators, the Effective Tax Rate KPI and the Tax Budget KPI. Table III below outlines exemplary drill down options for the Effective Tax Rate KPI. The user driven dimensions associated with the Effective Tax Rate KPI may include presenting data and analysis arranged by Entry Type, Reporting Unit, Market Flag, Company Organization, Time, Scenario, and Currency dimensions. The Tax Excellence perspective may present data and analysis arranged by additional, fewer, or alternate dimensions.

TABLE III

Effective Tax Rate (ETR)

| Entry Type | Entry Type |
|---|---|
| Reporting Unit | Rank |
|  | Reporting Unit |
|  | Market |
| Market Flag | By Market Flag |
| Company | Federal Filing Group |
| Organization | Legal Entity |
|  | Company Code |
| Time | Year - Quarter - Month |
| Scenario | Actual |
|  | Budget |
| Currency | Forecast |
|  | U.S. Dollar |
|  | British Pound |
|  | Japanese Yen |
|  | Euro |

The Entry Type dimension may include data corresponding to an Entry Type sub-dimension, which may present data and analysis based upon the type of data entry. The Market Flag dimension may include data arranged by a Market Flag sub-dimension, which may present data and analysis by a flag associated with each market, such as a national, state, country, or regional flag.

The Reporting Unit dimension may include data and analysis arranged and presented by Rank, Reporting Unit, and Market sub-dimensions. The Rank sub-dimension may arrange and present data and analysis based upon the ranking of each reporting unit according to associated effective tax rates. The Reporting Unit sub-dimension may present analysis and data based upon the reporting unit from which the data originated. The Market sub-dimension may present analysis and data by market. Each market may pertain to a geographic market, such as a region, country, state, or other boundary defined market.

The Company Organization dimension may include data and analysis arranged by Federal Filing Group, Legal Entity, and Company Code sub-dimensions. The Federal Filing Group sub-dimension may present data and analysis arranged by filing group. The Legal Entity sub-dimension may present data and analysis arranged by which legal entity of a company or organization the underlying data originated from. The Company Code sub-dimension may present data and analysis arranged by company identifiers or whether the organization from which the underlying data originated from is a domestic or foreign entity.

The Time dimension may include data corresponding to Year, Quarter, and Month sub-dimensions, which may present data and analysis according to yearly, quarterly, and monthly timeframes, respectively. The Scenario dimension may include data corresponding to Actual, Budget, and Forecast sub-dimensions, which may present data and analysis according to actual, budgeted, and forecasted tax and/or financial scenarios, respectively. The Currency dimension may include data corresponding to various Currency sub-dimensions. Each Currency sub-dimension may present data and analysis according to a currency, such as the U.S. dollar, British pound, Japanese yen, euro, or other monetary unit.

The drill down options for the Tax Budget KPI are outlined in Table IV below. The drill down options may include presenting data related to Account, Time, and Scenario dimensions. The Account dimension may include data corresponding to Account Category and Account Name & Number sub-dimensions. The Account Category sub-dimension may present data and analysis arranged by type of account or account description. The Account Name & Number sub-dimension may present data and analysis arranged by account name or account identification number.

TABLE IV

| | YTD Amount |
|---|---|
| Account | Account Category |
| | Account Name & Number |
| Time | Year - Quarter - Month |
| Scenario | Actual |
| | Budget |
| | Forecast |

The Time dimension may include data corresponding to Year, Quarter, and Month sub-dimensions, which may present data and analysis arranged by yearly, quarterly, or monthly timeframes, respectively. The Scenario dimension may include data corresponding to Actual, Budget, and Forecast sub-dimensions, which may present data and analysis according to actual, budgeted, and forecasted tax and/or financial scenarios, respectively. Additional, fewer, or alternate dimensions and sub-dimensions may be presented for any KPI corresponding to tax scorecard windows or perspectives.

The example of FIG. 5 illustrates a Business Process Excellence perspective having four corresponding key performance indicators, the Active Processes KPI, the Completed Processes KPI, the Documents Contributed KPI, and the Documents Accessed KPI. The drill down options for the Active Processes KPI and the Completed Processes KPI are outlined in Table V below. The drill down options may include presenting data related to Process Status, Process Definition, Functional Area, and Time dimensions.

TABLE V

| | Process Total |
|---|---|
| Process Status | Active |
| | Completed |
| Process Definition | Process Type |
| | Process Definition |
| | Process Instance |
| Functional Area | Functional Area User |
| Time | Year - Quarter - Month |

The Process Status dimension may include data corresponding to Active and Completed sub-dimensions, which may present data and analysis of ongoing and completed tax business processes, respectfully. The Process Definition dimension may include data corresponding to Process Type, Process Definition, and Process Instance sub-dimensions. The Process Type sub-dimension may present data and analysis arranged by type of business process. The Process Definition sub-dimension may present data and analysis by the manner in which a business process is defined. The Process Instance sub-dimension may present data and analysis based upon the initiation of business processes.

The Functional Area dimension may include data corresponding to Functional Area and User sub-dimensions. The Functional Area sub-dimension may arrange data and analysis based upon the function that each process performs. Each process may be assigned a functional area identification number when it is initiated. The User sub-dimension may arrange data and analysis based upon a user's name or identification number. That user may have initiated the business process, be assigned to complete the business process, or be responsible for ensuring that the business process is completed. The Time sub-dimension may include data corresponding to Year, Quarter, and Month sub-dimensions, which may present data and analysis arranged by yearly, quarterly, and monthly timeframes, respectively.

The data and analysis corresponding to each dimension and sub-dimension may be arranged in either a chart view or table view format. For example, as shown previously in FIG. 11, the Process Status data may be presented in a chart view format. Additionally, as shown in FIG. 12, the Process Definition data may be presented in a table view format.

The drill down options for the Documents Contributed KPI and the Documents Accessed KPI are outlined in Table VI below. The drill down options may include data related to Event Type, Functional Area, and Time dimensions. The Event Type dimension may include data corresponding to Contributed and Accessed sub-dimensions, which may present data and analysis of the number of documents contributed to a database or accessed, respectively.

TABLE VI

| | Document Total |
|---|---|
| Event Type | Contributed |
| | Accessed |
| Functional Area | Functional Area User |
| Time | Year - Quarter - Month |

The Functional Area dimension may include data corresponding to Functional Area and User sub-dimensions. The Functional Area sub-dimension may arrange data and analysis based upon the function that each business process performs. Each business process may be assigned a functional area identification number when it is initiated. The User sub-dimension may arrange data and analysis based upon a user's name or identification number. That user may have initiated the business process, be assigned to complete the business process, or be responsible for ensuring that the business process is completed. The Time sub-dimension may include data corresponding to Year, Quarter, and Month sub-dimensions, which may present data and analysis arranged by yearly, quarterly, and monthly timeframes, respectively. Additional, fewer, or alternate dimensions and sub-dimensions may be presented for any KPI corresponding to business process scorecard windows or perspectives.

The example of FIG. 5 shows a Finance Excellence perspective having two corresponding key performance indicators, the Income Before Taxes (IBT) Forecast KPI and the Rating Agency Liquidity Ratio KPI. The drill down options for the Income Before Taxes KPI are outlined in Table VII below. The drill down options may include presenting data related to Consolidated by Division, Time, and Scenario dimensions.

TABLE VII

Income Before Taxes (IBT) Forecast

| | |
|---|---|
| Consolidated by Division | Division |
| | Business Market |
| | Business Market Region |
| Time | Year - Quarter - Month |
| Scenario | Actual |
| | Forecast |

The Consolidated by Division dimension may include data corresponding to Division, Business Market, and Business Market Region sub-dimensions. The Division sub-dimension may present data and analysis by division, department, or other grouping of a company. The Business Market sub-dimension may present data and analysis by type of business market, such as pharmaceutical, agricultural, service industry, airline, restaurant, or other type of business market. The Business Market Region sub-dimension may present data and analysis by market region, such as country, state, region, or other geographical area.

The Time dimension may include data corresponding to Year, Quarter, and Month sub-dimensions, which may present data and analysis arranged by yearly, quarterly, or monthly timeframes, respectively. The Scenario dimension may include data corresponding to Actual, Budget, and Forecast sub-dimensions, which may present data and analysis based upon actual, budgeted, and forecasted tax and/or financial scenarios, respectively.

The drill down options for the Rating Agency Liquidity Ratio KPI is outlined below in Table VIII. The drill down options may include presenting data related to the Time dimension. The Time dimension may include data corresponding to Year, Quarter, and Month sub-dimensions, which may present data and analysis arranged by yearly, quarterly, and monthly sub-dimensions. Additional, fewer, or alternate dimensions and sub-dimensions may be presented for any KPIs corresponding to financial scorecard windows or perspectives.

TABLE VIII

Liquidity Ratio

| | |
|---|---|
| Time | Year - Quarter - Month |

The example of FIG. 5 shows an Employee Excellence perspective having five corresponding key performance indicators, the Communication KPI, the Performance Feedback KPI, the Cross-Function Collaboration KPI, the Growth KPI, and the Allocation of Time KPI. The drill down options for the Employee Excellence perspective KPIs are outlined in Table IX below. The drill down options may include presenting data related to Question Category, Response Options, Respondent, and Time dimensions.

TABLE IX

Average Response Value
Response Counter
Response Values

| | |
|---|---|
| Question Category | Question Category |
| | Question |

TABLE IX-continued

Average Response Value
Response Counter
Response Values

| | |
|---|---|
| Response Options | Response Options |
| Respondent | Functional Area |
| | Respondent |
| Time | Year - Quarter - Month |

The Question Category dimension may include data corresponding to Question Category and Question sub-dimensions, which may present data and analysis based upon the category of question or the specific question answered by a user, respectively. The Response Options dimension may include data corresponding to a Response Options sub-dimension, which may present data and analysis based upon the possible response option for each question.

The Respondent dimension may include data corresponding to Functional Area and Respondent sub-dimensions. The Functional Area sub-dimension may arrange data and analysis based upon the functional area of a tax division to which the respondent belongs. The Respondent sub-dimension may arrange data and analysis based upon a respondent's name or identification number. The Time dimension may include data corresponding to Year, Quarter, and Month sub-dimensions, which may present data and analysis arranged by yearly, quarterly, and monthly timeframes, respectively. Additional, fewer, or alternate dimensions and sub-dimensions may be presented for any KPIs corresponding to scorecard windows or perspectives dedicated to gathering and presenting tax employee survey information.

The tax scorecard reporting system provides analyses of multiple tax perspectives and underlying objectives and key performance indicators. The scorecard provides a study of the tax health of a company from multiple viewpoints. Each viewpoint provides insights into strengths and weaknesses which may not be readily apparent in other viewpoints, leading to a better understanding of the tax health of the organization. Thus, rather than relying on a single, highly condensed, summarized, and cursory perspective of organizational tax performance, the scorecard instead provides a view through multiple lenses of organizational tax performance. The analysis of multiple tax perspectives provides tax and other management personnel an easy to comprehend diagnosis of multiple tax related aspects of an organization. Management personnel may quickly understand the tax strengths and weaknesses of an organization by viewing the tax scorecard.

Additionally, the tax strengths and weaknesses identified by the tax reporting system are based upon tax data updated on a periodic basis. Hence, the tax scorecard reporting system may timely identify and conveniently summarize excelling areas or problematic areas of a company from multiple perspectives. Therefore, the tax scorecard reporting system provides a tool which management personnel may employ to effectively and efficiently address weak performance areas and quickly respond to developing weak areas (e.g., areas newly represented by negatively trending status indicators).

The tax scorecard reporting system also provides a comprehensive view of a tax division or department. The tax perspectives may present analysis of tax and financial perspectives, as well as monitor tax related business perspectives and the attitude and moral of tax employees. The analysis presented may present unique insight into why performance for a given tax unit or division is unsatisfactory or beginning to decline or lag behind. Additionally, presenting detailed analysis by multiple dimensions further facilitates the comprehension of the analysis presented and identification of possible underlying reasons for unsatisfactory or declining performance.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

We claim:

1. A data processing system for scorecard reporting, the data processing system comprising:
    a processor;
    a memory coupled to the processor, the memory comprising:
        a scorecard database comprising performance data for a particular business function; and
        a metrics processing program operable to generate:
            evaluated key performance indicators for the particular business function based upon the performance data;
            evaluated objectives for the particular business function based upon the evaluated key performance indicators; and
            multiple different perspectives for the particular business function based upon the evaluated objectives;
    wherein the processor is operable to generate a scorecard display comprising a different scorecard window for each of the multiple different perspectives, each different scorecard window for a particular one of the multiple different perspectives, and comprising:
        at least one of the evaluated objectives underlying the particular one of the multiple different perspectives for the scorecard window in which the at least one evaluated objective is displayed; and
        at least one of the evaluated key performance indicators underlying at least one of the evaluated objectives displayed in each scorecard window.

2. The data processing system of claim 1, where:
    the multiple different perspectives comprise a finance excellence perspective;
    the different scorecard windows comprise a finance excellence scorecard window; and
    the evaluated objectives include a finance excellence objective, the finance excellence scorecard window further comprising:
        a finance excellence objective link that accesses an underlying informational window for the finance excellence objective, the underlying informational window comprising attribute names and attribute values for the finance excellence objective.

3. The data processing system of claim 1, where:
    the multiple different perspectives comprise a business process excellence perspective;
    the different scorecard windows comprise a business process excellence scorecard window; and
    the evaluated objectives include a business process excellence objective, the business process excellence scorecard window further comprising:
        a business process excellence objective link that accesses an underlying informational window for the business process excellence objective, the underlying informational window comprising attribute names and attribute values for the business process excellence objective.

4. The data processing system of claim 1, where:
    the multiple different perspectives comprise an employee excellence perspective;
    the different scorecard windows comprise an employee excellence scorecard window; and
    the evaluated objectives include an employee excellence objective, the employee excellence scorecard window further comprising:
        an employee excellence objective link that accesses an underlying informational window for the employee excellence objective, the underlying informational window comprising attribute names and attribute values for the employee excellence objective.

5. The data processing system of claim 1, where:
    the multiple different perspectives comprise a tax excellence perspective;
    the different scorecard windows comprise a tax excellence scorecard window; and
    the evaluated objectives include a tax excellence objective, the tax excellence scorecard window further comprising:
        a tax excellence objective link that accesses an underlying informational window for the tax excellence objective, the underlying informational window comprising attribute names and attribute values for the tax excellence objective.

6. The data processing system of claim 1, where at least one of the different scorecard windows comprises:
    a status indicator icon summarizing status for at least one of the evaluated objectives.

7. The data processing system of claim 1, where at least one of the different scorecard windows comprises:
    a time slice selector operable to accept a selection of a specific time period to view.

8. A scorecard reporting method comprising:
    storing performance data for a particular business function in a memory;
    executing a metrics processing program with a processor to generate:
        evaluated key performance indicators for the particular business function based upon the performance data;
        evaluated objectives for the particular business function based upon the evaluated key performance indicators; and
        multiple different perspectives for the particular business function based upon the evaluated objectives; and
    generating with the processor a scorecard display comprising a different scorecard window for each of the multiple different perspectives, each different scorecard window for a particular one of the multiple different perspectives, and comprising:
        at least one of the evaluated objectives underlying the particular one of the multiple different perspectives for the scorecard window in which the at least one evaluated objective is displayed; and
        at least one of the evaluated key performance indicators underlying at least one of the evaluated objectives displayed in each scorecard window.

9. The method of claim 8, where:
    the multiple different perspectives comprise a finance excellence perspective;
    the different scorecard windows comprise a finance excellence scorecard window; and
    the evaluated objectives include a finance excellence objective, the finance excellence scorecard window further comprising:
        a finance excellence objective link that accesses an underlying informational window for the finance excellence objective, the underlying informational window comprising attribute names and attribute values for the finance excellence objective.

10. The method of claim 8, where:
the multiple different perspectives comprise a business process excellence perspective;
the different scorecard windows comprise a business process excellence scorecard window; and
the evaluated objectives include a business process excellence objective, the business process excellence scorecard window further comprising:
a business process excellence objective link that accesses an underlying informational window for the business process excellence objective, the underlying informational window comprising attribute names and attribute values for the business process excellence objective.

11. The method of claim 8, where:
the multiple different perspectives comprise an employee excellence perspective;
the different scorecard windows comprise an employee excellence scorecard window; and
the evaluated objectives include an employee excellence objective, the employee excellence scorecard window further comprising:
an employee excellence objective link that accesses an underlying informational window for the employee excellence objective, the underlying informational window comprising attribute names and attribute values for the employee excellence objective.

12. The method of claim 8, where:
the multiple different perspectives comprise a tax excellence perspective;
the different scorecard windows comprise a tax excellence scorecard window; and
the evaluated objectives include a tax excellence objective, the tax excellence scorecard window further comprising:
a tax excellence objective link that accesses an underlying informational window for the tax excellence objective, the underlying informational window comprising attribute names and attribute values for the tax excellence objective.

13. The method of claim 8, further comprising generating with the processor, in at least one of the different scorecard windows:
a status indicator icon summarizing status for at least one of the evaluated objectives.

14. The method of claim 8, further comprising accepting, for at least one of the different scorecard windows, a selection of a specific time period to view.

15. A product comprising:
a non-transitory computer-readable medium; and
instructions stored on the medium that, when executed, cause a processor to:
store performance data for a particular business function in a memory;
execute a metrics processing program with a processor to generate:
evaluated key performance indicators for the particular business function based upon the performance data;
evaluated objectives for the particular business function based upon the evaluated key performance indicators; and
multiple different perspectives for the particular business function based upon the evaluated objectives; and
generate with the processor a scorecard display comprising a different scorecard window for each of the multiple different perspectives, each different scorecard window for a particular one of the multiple different perspectives, and comprising:
at least one of the evaluated objectives underlying the particular one of the multiple different perspectives for the scorecard window in which the at least one evaluated objective is displayed; and
at least one of the evaluated key performance indicators underlying at least one of the evaluated objectives displayed in each scorecard window.

16. The product of claim 15, where:
the multiple different perspectives comprise a finance excellence perspective;
the different scorecard windows comprise a finance excellence scorecard window; and
the evaluated objectives include a finance excellence objective, the finance excellence scorecard window further comprising:
a finance excellence objective link that accesses an underlying informational window for the finance excellence objective, the underlying informational window comprising attribute names and attribute values for the finance excellence objective.

17. The product of claim 15, where:
the multiple different perspectives comprise a business process excellence perspective;
the different scorecard windows comprise a business process excellence scorecard window; and
the evaluated objectives include a business process excellence objective, the business process excellence scorecard window further comprising:

18. The product of claim 15, where:
the multiple different perspectives comprise an employee excellence perspective;
the different scorecard windows comprise an employee excellence scorecard window; and
the evaluated objectives include an employee excellence objective, the employee excellence scorecard window further comprising:
an employee excellence objective link that accesses an underlying informational window for the employee excellence objective, the underlying informational window comprising attribute names and attribute values for the employee excellence objective.

19. The product of claim 15, where:
the multiple different perspectives comprise a tax excellence perspective;
the different scorecard windows comprise a tax excellence scorecard window; and
the evaluated objectives include a tax excellence objective, the tax excellence scorecard window further comprising:
a tax excellence objective link that accesses an underlying informational window for the tax excellence objective, the underlying informational window comprising attribute names and attribute values for the tax excellence objective.

20. The product of claim 15, where the instructions, when executed, further cause the processor, for at least one of the different scorecard windows, to:
generate a status indicator icon summarizing status for at least one of the evaluated objectives.

21. The product of claim 15, where the instructions, when executed, further cause the processor to:
accept, for at least one of the different scorecard windows, a selection of a specific time period to view.

* * * * *

UNITED STATES PATENT AND TRADEMARK OFFICE
CERTIFICATE OF CORRECTION

PATENT NO. : 8,335,730 B2
APPLICATION NO. : 12/830171
DATED : December 18, 2012
INVENTOR(S) : David A. Davidson et al.

It is certified that error appears in the above-identified patent and that said Letters Patent is hereby corrected as shown below:

In the Specification

In column 18, replace Table III with the following table.

TABLE III

| Effective Tax Rate (ETR) | |
|---|---|
| Entry Type | Entry Type |
| Reporting Unit | Rank<br>Reporting Unit<br>Market |
| Market Flag | By Market Flag |
| Company Organization | Federal Filing Group<br>Legal Entity<br>Company Code |
| Time | Year – Quarter – Month |
| Scenario | Actual<br>Budget<br>Forecast |
| Currency | U.S. Dollar<br>British Pound<br>Japanese Yen<br>Euro |

Signed and Sealed this
Seventh Day of May, 2013

Teresa Stanek Rea
*Acting Director of the United States Patent and Trademark Office*